United States Patent
Qiao (10) Patent No.: US 12,258,068 B2
(45) Date of Patent: Mar. 25, 2025

(54) CHASSIS OF AUTOMATED GUIDED VEHICLE AND AUTOMATED GUIDED VEHICLE

(71) Applicant: BEIJING JINGDONG QIANSHI TECHNOLOGY CO., LTD., Beijing (CN)

(72) Inventor: Longlong Qiao, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 657 days.

(21) Appl. No.: 17/611,049

(22) PCT Filed: Apr. 21, 2020

(86) PCT No.: PCT/CN2020/085985
§ 371 (c)(1),
(2) Date: Nov. 12, 2021

(87) PCT Pub. No.: WO2020/238492
PCT Pub. Date: Dec. 3, 2020

(65) Prior Publication Data
US 2022/0306209 A1 Sep. 29, 2022

(30) Foreign Application Priority Data
May 24, 2019 (CN) .......................... 201910437842.6

(51) Int. Cl.
B62D 21/18 (2006.01)
B62D 61/10 (2006.01)

(52) U.S. Cl.
CPC ............. *B62D 21/18* (2013.01); *B62D 61/10* (2013.01)

(58) Field of Classification Search
CPC ................................ B62D 21/18; B62D 61/10
See application file for complete search history.

(56) References Cited

U.S. PATENT DOCUMENTS

2018/0072212 A1* 3/2018 Alfaro ....................... B60P 1/48
2019/0291528 A1* 9/2019 Pajevic ................. B60P 1/6445
2020/0369501 A1* 11/2020 Zou ......................... B66F 9/063

FOREIGN PATENT DOCUMENTS

CN 105329335 A 2/2016
CN 105730553 A 7/2016
(Continued)

OTHER PUBLICATIONS

"International Search Report and English language translation", International Application No. PCT/CN2020/085985, Jul. 8, 2020, 7 pp.
(Continued)

*Primary Examiner* — Jacob D Knutson
*Assistant Examiner* — Abigail R Hymel
(74) *Attorney, Agent, or Firm* — Myers Bigel, P.A.

(57) ABSTRACT

The present disclosure relates to a chassis of an automated guided vehicle. The chassis of an automated guided vehicle includes a first mounting plate (100); a first wheel set mounted on the first mounting plate (100); a second mounting plate (200) rotatably connected to the first mounting plate (100); a second wheel set mounted on the second mounting plate (200); a support frame (701); a first connecting rod (702) rotatably connected to the support frame (701) and the first mounting plate (100), respectively; and a second connecting rod (703) fixedly connected to the support frame (701) at one end thereof, and rotatably connected to the second mounting plate (200) at the other end thereof. The automated guided vehicle includes the above-mentioned chassis of an automated guided vehicle.

10 Claims, 7 Drawing Sheets

(56) References Cited

FOREIGN PATENT DOCUMENTS

| | | | | |
|---|---|---|---|---|
| CN | 206243253 | U | 6/2017 | |
| CN | 207015475 | U | 2/2018 | |
| CN | 108312802 | A | 7/2018 | |
| CN | 108725626 | A | 11/2018 | |
| CN | 108791569 | A | 11/2018 | |
| CN | 109383663 | A * | 2/2019 | ............. B62D 63/02 |
| CN | 208802074 | U | 4/2019 | |
| CN | 210027597 | U | 2/2020 | |
| DE | 20200619 | U1 | 3/2002 | |
| EP | 2826693 | A2 | 1/2015 | |
| JP | H06305358 | A | 11/1994 | |
| JP | H0781639 | A | 3/1995 | |
| JP | 2000351385 | A | 12/2000 | |
| JP | 2005313720 | A | 11/2005 | |
| JP | 2019077389 | A | 5/2019 | |
| WO | WO-2019029537 | A1 * | 2/2019 | ............... B60D 1/34 |

OTHER PUBLICATIONS

"Communication with Supplementary European Search Report", EP Application No. 20814133.3, Dec. 1, 2022, 9 pp.
"Notice of Reason for Rejection and English language translation", JP Application No. 2021-569520, Nov. 14, 2022, 6 pp.
"First Examination Opinion Notification and English-language translation", CN Application No. 201910437842.6, Nov. 29, 2024, 26 pp.

* cited by examiner

CHASSIS OF AUTOMATED GUIDED VEHICLE AND AUTOMATED GUIDED VEHICLE

RELATED APPLICATIONS

The present application is a 35 U.S.C. § 371 national stage application of PCT Application No. PCT/CN2020/085985, filed on Apr. 21, 2020, which is based on and claims priority to Chinese patent application No. 201910437842.6, filed on May 24, 2019, the disclosures of both of which are hereby incorporated in their entireties. The above-referenced PCT International Application was published in the Chinese language as International Publication No. WO 2020/238492 A1 on Dec. 3, 2020.

FIELD OF THE INVENTION

The present disclosure relates to the technical field of vehicles, and in particular, to a chassis of an automated guided vehicle and an automated guided vehicle.

BACKGROUND OF THE INVENTION

With the development of technology, automated guided vehicles (AGVs) are not only used in industrial production lines, but also in many logistics industries such as goods-to-person systems and line-side transfer where AGVs have been introduced in large quantities to achieve warehouse automation. Unlike in industrial production lines, the demand for AGVs in the field of warehousing and logistics is great, and the load of an AGV in use tends to be 100 kg-1000 kg, and the whole AGV is required to have the characteristics of a small size, light weight, fast speed, low cost, etc.

It should be noted that the information disclosed in the background section of the present disclosure is only intended to enhance understanding of the general background of the present disclosure, and should not be considered as an admission or any form of implication that the information constitutes related technology well known to those skilled in the art.

SUMMARY OF THE INVENTION

According to an aspect of the present disclosure, a chassis of an automated guided vehicle is provided, including:
  a first mounting plate;
  a first wheel set mounted on the first mounting plate;
  a second mounting plate rotatably connected to the first mounting plate;
  a second wheel set mounted on the second mounting plate;
  a support frame;
  a first connecting rod rotatably connected to the support frame and the first mounting plate, respectively; and
  a second connecting rod fixedly connected to the support frame at one end thereof, and rotatably connected to the second mounting plate at the other end thereof.

In some embodiments, the second connecting rod includes a first rod segment and a second rod segment, the first rod segment and the second rod segment being connected and perpendicular to each other, an end of the first rod segment away from the second rod segment being rotatably connected to the first connecting rod, and an end of the second rod segment away from the first rod segment being rotatably connected to the second mounting plate.

In some embodiments, the chassis of an automated guided vehicle includes two first connecting rods and two second connecting rods, the support frame is rectangular; and the first connecting rods, the second connecting rods and the support frame are connected to form a cuboid support bracket.

In some embodiments, the chassis of an automated guided vehicle further includes a connection assembly connected between the first mounting plate and the second mounting plate to enable the first mounting plate and the second mounting plate to rotate relative to each other.

In some embodiments, the connection assembly includes:
  a first connecting seat mounted on the first mounting plate;
  a second connecting seat mounted on the second mounting plate; and
  a first connecting shaft configured to connect the first connecting seat and the second connecting seat to enable the first connecting seat and the second connecting seat to rotate relative to each other.

In some embodiments, the chassis of an automated guided vehicle further includes a limiting assembly configured to limit an angle of the relative rotation between the first mounting plate and the second mounting plate.

In some embodiments, the automated guided vehicle further includes a limiting assembly configured to limit an angle of the relative rotation between the first mounting plate and the second mounting plate, the limiting assembly including a limiting plate, which is connected to the first connecting seat and a surface of the limiting plate close to the first connecting seat includes a first mating part and a second mating part connected with the first mating part, the first mating part being in contact with an upper surface of the first connecting seat, the second mating part extending in a direction away from the first connecting seat and being inclined upward with respect to the first mating part.

In some embodiments, the limiting assembly further includes a limiting sleeve, which is mounted on the second connecting seat, the limiting plate being provided with a first hole, a diameter of the first hole being greater than an outer diameter of the limiting sleeve, the limiting sleeve passing through the first hole and moving relative to the limiting plate, the limiting sleeve being provided with a limiting part at an end away from the second connecting seat, the limiting part being configured to restrict the limiting sleeve from escaping from the first hole.

In some embodiments, the limiting part includes a boss extending radially outwardly of the limiting sleeve, and the diameter of the limiting part is greater than that of the first hole.

In some embodiments, the limiting assembly further includes a spacer sleeve, which is arranged between the limiting plate and the limiting part.

In some embodiments, the first wheel set includes a first universal wheel assembly and a drive wheel assembly, and the second wheel set includes a second universal wheel assembly.

In some embodiments, the first universal wheel assembly includes:
  a first mounting bracket rotatably mounted on the first mounting plate;
  a first universal wheel mounted at a first end of the first mounting bracket; and
  a second universal wheel mounted at a second end of the first mounting bracket;
  and/or
  the second universal wheel assembly includes:

a second mounting bracket rotatably mounted on the second mounting plate;

a third universal wheel mounted at a first end of the second mounting bracket; and a fourth universal wheel mounted at a second end of the second mounting bracket.

In some embodiments, a connecting line between a rotation center of the first universal wheel and a rotation center of the second universal wheel is parallel to a rotation axis between the first mounting plate and the second mounting plate; and/or a connecting line between a rotation center of the third universal wheel and a rotation center of the fourth universal wheel is parallel to a rotation axis between the first mounting plate and the second mounting plate.

In some embodiments, the chassis of an automated guided vehicle includes two drive wheel assemblies, which are mounted on two sides of the first mounting plate, respectively, each of the two drive wheel assemblies including:

a drive wheel bracket mounted on the first mounting plate;

a speed reducer mounted on the drive wheel bracket;

a motor connected to the speed reducer; and a drive wheel in drive connection with an output shaft of the speed reducer.

According to another aspect of the present disclosure, an automated guided vehicle is provided, which includes the above-mentioned chassis of an automated guided vehicle.

Based on the above technical solution, the chassis in the embodiment of the present disclosure includes the first mounting plate and the second mounting plate that are rotatably connected to each other, so that when the road surface is uneven, by relative rotation of the first mounting plate and the second mounting plate, both the first wheel set and the second wheel set can touch the ground to ensure the steadiness of a vehicle body mounted on the chassis; furthermore, the chassis also includes the support frame, the first connecting rod and the second connecting rod, the first connecting rod being rotatably connected to the support frame and the first mounting plate, and the second connecting rod being fixedly connected to the support frame and rotatably connected to the second mounting plate, so when the first mounting plate and the second mounting plate rotate relative to each other, the first connecting rod and the second connecting rod also correspondingly rotate relative to the first mounting plate and the second mounting plate, and the first connecting rod and the second connecting rod can also provide the possibility of uniform distribution of the weight carried by the support frame, on the first mounting plate and the second mounting plate, to avoid dive or lift of the vehicle body, and further ensure the stability of the vehicle body.

Other features and advantages of the present disclosure will become apparent from the following detailed description of exemplary embodiments of the present disclosure with reference to the accompanying drawings.

BRIEF DESCRIPTION OF THE DRAWINGS

To more clearly describe technical solutions in the embodiments of the present disclosure or in the related art, a brief introduction to the drawings for use in description of the embodiments or the related art will be given below. Obviously, the drawings in the following description only illustrate some embodiments of the present disclosure, and other drawings may also be obtained by those of ordinary skill in the art based on the drawings provided herein without creative work.

DETAILED DESCRIPTION OF THE EMBODIMENTS

The technical solutions in the embodiments will be described clearly and completely below in conjunction with the accompanying drawings in the embodiments of the present disclosure. Obviously, the described embodiments are only a part of the embodiments of the present disclosure, and not all the embodiments. Based on the embodiments of the present disclosure, all other embodiments obtained by those of ordinary skill in the art without creative work shall fall within the protection scope of the present disclosure.

In description of the present disclosure, it should be understood that orientation or position relations denoted by the terms "center", "transverse", "longitudinal", "front", "rear", "left", "right", "upper", "lower", "vertical", "horizontal", "top", "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be understood as limiting the protection scope of the present disclosure.

After research, the inventor found that chassis structures of automated guided vehicles in the related art mainly include the following two forms.

(1) Drive wheels can float up and down, auxiliary wheels are fixed and the chassis is capable of adapting to the ground.

For an AGV wheel train of a fixed vehicle model, a positive pressure thereof is determined. According to the positive pressure relationship between a drive force F and μFn, the magnitude of the drive force not only depends on the power of a drive motor. With the same motor power, the magnitude of the positive pressure is also a key factor for acceleration and efficiency. For the chassis structure in this form, operational stability of a vehicle body can be maintained only by increasing the self-weight of the vehicle body or by increasing a friction coefficient μ. However, increasing the self-weight of the vehicle body causes an increase in power loss, and increasing the friction coefficient μ causes an increase in the maintenance cost of a logistics site.

(2) Drive wheels are fixed, and auxiliary wheels can adapt to the road surface.

As the drive wheels are fixed, and auxiliary wheels float, a positive pressure increases with the increase of a load of a vehicle body. However, a dive or lift phenomenon occurs during acceleration or deceleration, leading to low stability of a carrying platform of the vehicle, and this is more disadvantageous especially for transferring liquid-type goods.

Figure 1:
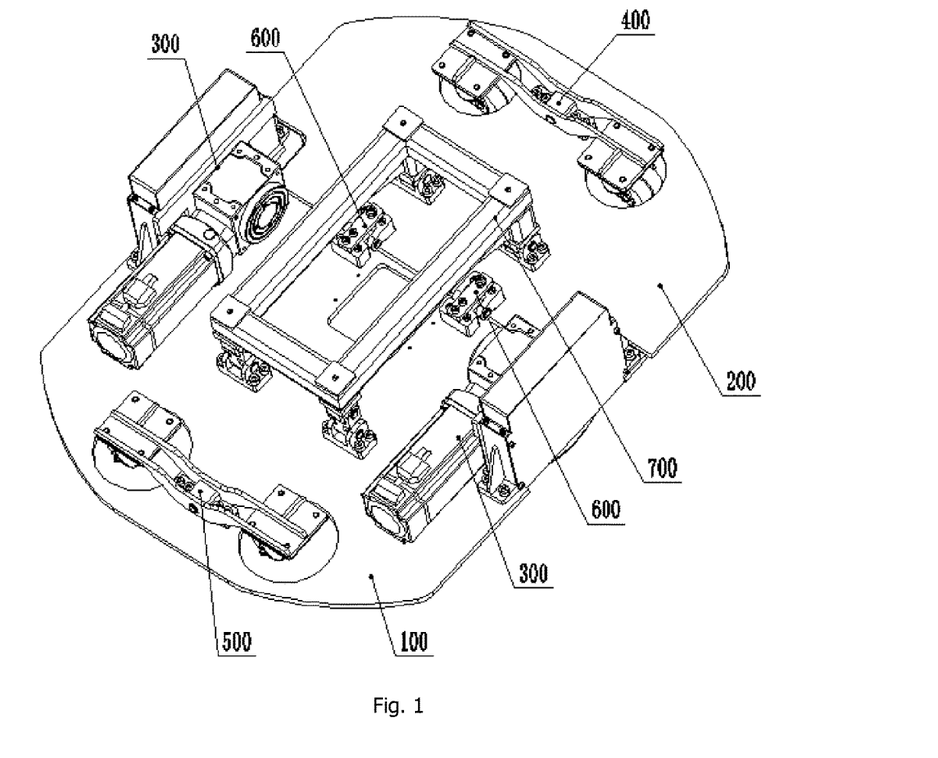
FIG. 1 is a structural diagram of some embodiments of a chassis of an automated guided vehicle of the present disclosure.
Figure 14:
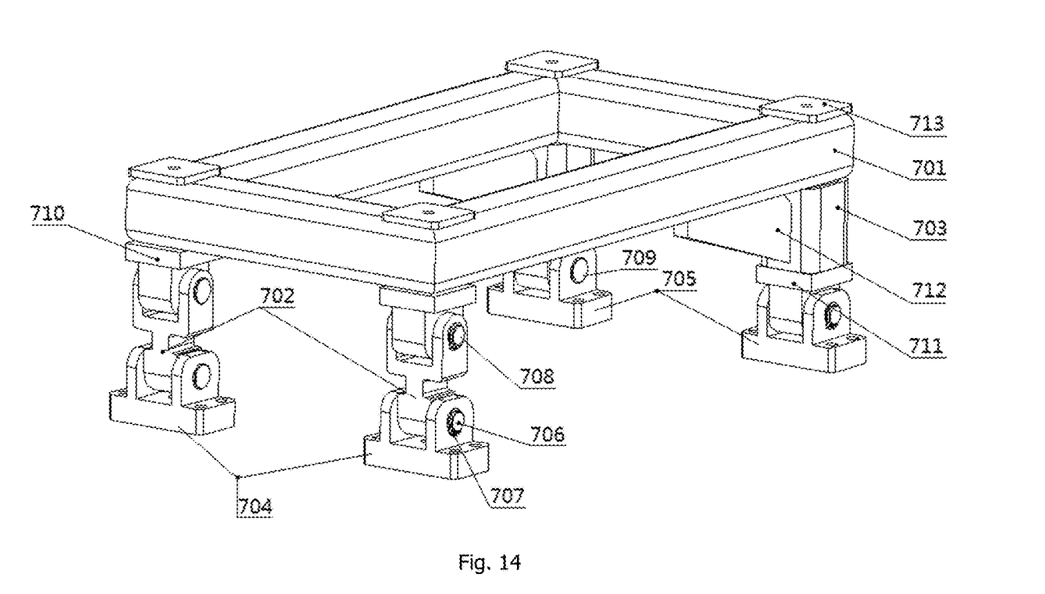
FIG. 14 is a structural diagram of a support frame in some embodiments of the chassis of an automated guided vehicle of the present disclosure.

Based on the above research, the inventor improved the structure of the automated guided vehicle. Referring to FIGS. 1 and 14, in some embodiments of a chassis of an automated guided vehicle provided in the present disclosure, the chassis includes a first mounting plate 100, a first wheel set, a second mounting plate 200, a second wheel set, a support frame 701, a first connecting rod 702, and a second connecting rod 703, wherein the second mounting plate 200 is rotatably connected to the first mounting plate 100; the first wheel set is mounted on the first mounting plate 100; the second wheel set is mounted on the second mounting plate 200; the first connecting rod 702 is rotatably connected to the support frame 701 and the first mounting plate 100, respectively; and one end of the second connecting rod 703 are fixedly connected to the support frame 701, and the other end of the second connecting rod 703 are rotatably connected to the second mounting plate 200.

In the above embodiments, the chassis includes the first mounting plate 100 and the second mounting plate 200 that are rotatably connected to each other, so that when the road surface is uneven, by relative rotation of the first mounting plate 100 and the second mounting plate 200, both the first wheel set and the second wheel set can touch the ground to ensure the steadiness of a vehicle body mounted on the chassis; furthermore, the chassis also includes the support frame 701, the first connecting rod 702 and the second connecting rod 703, the first connecting rod 702 being rotatably connected to the support frame 701 and the first mounting plate 100, and the second connecting rod 703 being fixedly connected to the support frame 701 and rotatably connected to the second mounting plate 200, so when the first mounting plate 100 and the second mounting plate 200 rotate relative to each other, the first connecting rod 702 and the second connecting rod 703 also correspondingly rotate relative to the first mounting plate 100 and the second mounting plate 200, and the first connecting rod 702 and the second connecting rod 703 can also provide the possibility of uniform distribution of the weight carried by the support frame 701, on the first mounting plate 100 and the second mounting plate 200, to avoid dive or lift of the vehicle body, and further ensure the stability of the vehicle body.

Based on the chassis of an automated guided vehicle in the above embodiments, the present disclosure also proposes an automated guided vehicle, which includes the above-mentioned chassis of an automated guided vehicle. The positive technical effects of the embodiments of the chassis of the automated guided vehicle are also applicable to those of the automated guided vehicle and will not be repeated here.

Structures of some embodiments of a chassis of an automated guided vehicle provided in the present disclosure will be described below in conjunction with FIGS. 1-16.

As shown in FIG. 1, in some embodiments, the chassis of an automated guided vehicle includes a first mounting plate 100, a second mounting plate 200, a drive wheel assembly 300, a first universal wheel assembly 500, a connection assembly 600, a support body 700, and a second universal wheel assembly 400.

Two drive wheel assemblies 300 and the first universal wheel assembly 500 are mounted on the first mounting plate 100, and thus can form a triangular support and can be brought into contact with the ground at the same time to achieve high stability. The second universal wheel assembly 400 is mounted on the second mounting plate 200. The first mounting plate 100 and the second mounting plate 200 are rotatably connected to each other by two connection assemblies 600. The support body 700 is mounted above the first mounting plate 100 and the second mounting plate 200 and across the first mounting plate 100 and the second mounting plate 200.

In these embodiments, the first mounting plate 100 is provided on the front side of the automated guided vehicle, and the second mounting plate 200 is provided on the rear side of the automated guided vehicle. In other embodiments, the first mounting plate 100 and the second mounting plate 200 may also be provided on the left side and the right side of the automated guided vehicle, respectively, or arranged along an oblique direction.

Figure 2:
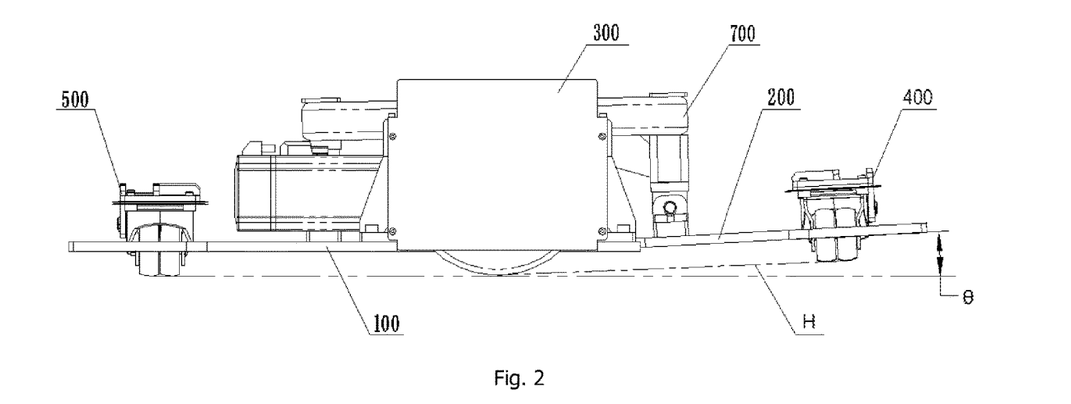
FIG. 2 is a structural diagram of some embodiments of the chassis of an automated guided vehicle of the present disclosure when a raised ground surface is encountered.

As shown in FIG. 2, when a raised road surface H is encountered, the second mounting plate 200 rotates counterclockwise with respect to the first mounting plate 100 at a rotating angle of θ to ensure that both the first wheel set and the second wheel set can touch the ground, and the support body 700 is slightly deformed to ensure the stability of the vehicle body and other components connected to the top of the support body 700 and achieve uniform load distribution on the support body 700.

Figure 3:
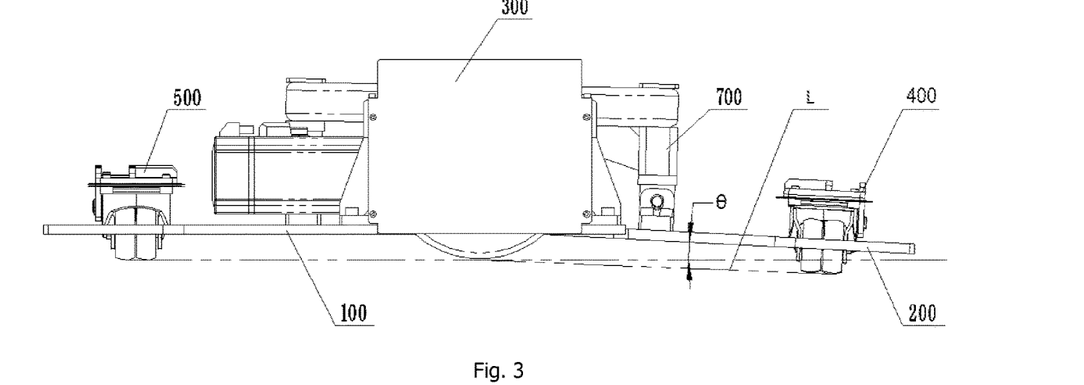
FIG. 3 is a structural diagram of some embodiments of the chassis of an automated guided vehicle of the present disclosure when a depressed ground surface is encountered.

As shown in FIG. 3, when a depressed road surface L is encountered, the second mounting plate 200 rotates clockwise with respect to the first mounting plate 100 at a rotating angle of θ to ensure that both the first wheel set and the second wheel set can touch the ground, and the support body 700 is slightly deformed to ensure the stability of the vehicle body and other components connected to the top of the support body 700 and achieve uniform load distribution on the support body 700.

Figure 4:
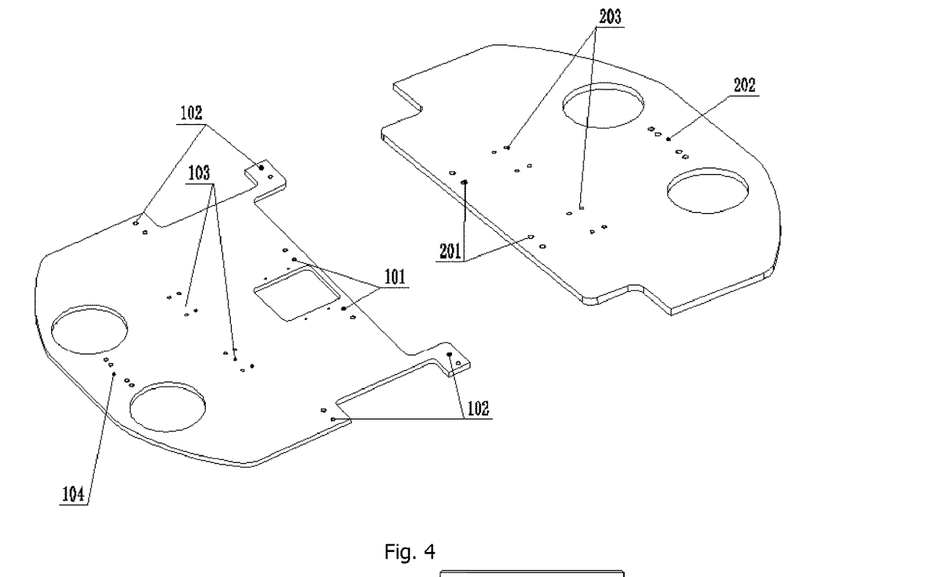
FIG. 4 is a structural diagram of a first mounting plate and a second mounting plate in some embodiments of the chassis of an automated guided vehicle of the present disclosure.
Figure 5:
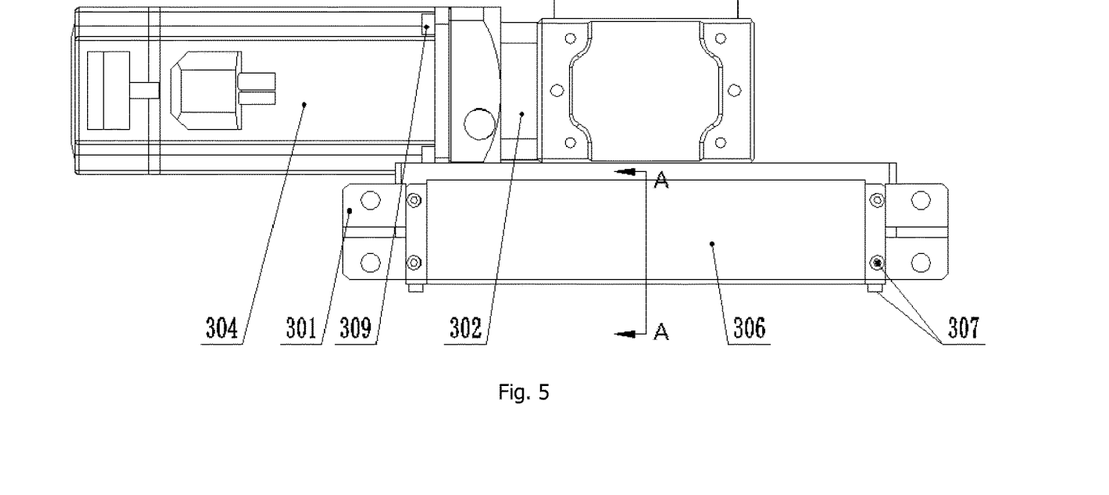
FIG. 5 is a top view of a drive wheel assembly in some embodiments of the chassis of an automated guided vehicle of the present disclosure.
Figure 6:
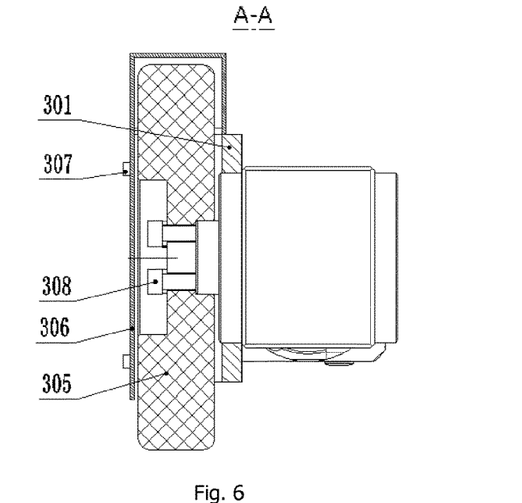
FIG. 6 is a schematic diagram of an A-A cross section in FIG. 5.
Figure 7:
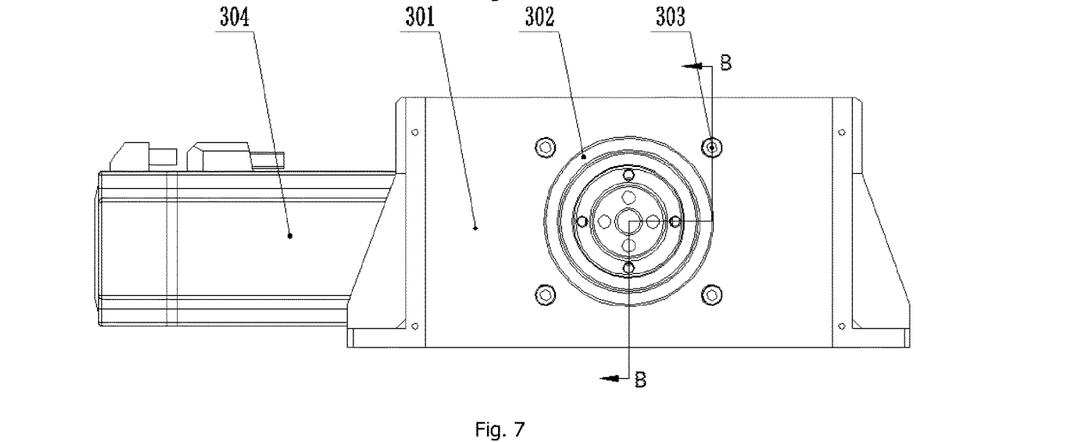
FIG. 7 is a front view of part of the structure of a drive wheel assembly in some embodiments of the chassis of an automated guided vehicle of the present disclosure.
Figure 8:
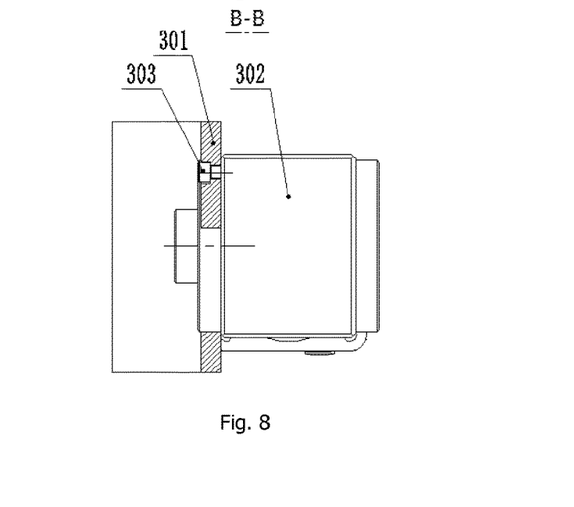
FIG. 8 is a schematic diagram of a B-B cross section in FIG. 7.

In some embodiments, as shown in FIG. 4, the first mounting plate 100 is provided with five sets of mounting holes, and the second mounting plate 200 is provided with three sets of mounting holes, wherein first mounting holes 101 and fifth mounting holes 201 are configured to mount the connection assemblies 600; second mounting holes 102 are configured to mount the drive wheel assemblies 300; third mounting holes 103 and seventh mounting holes 203 are configured to mount the support body 700; fourth mounting holes 104 are configured to mount the first universal wheel assembly 500; and sixth mounting holes 202 are configured to mount the second universal wheel assembly 400.

The first mounting plate 100 is provided with a concave portion and the second mounting plate 200 is provided with a convex portion, the convex portion being inserted into the concave portion to facilitate mounting and positioning of the first mounting plate 100 and the second mounting plate 200.

On the left and right sides of the first mounting plate 100 are respectively provided holes recessed inward configured to expose drive wheels of the drive wheel assemblies 300 from a bottom surface of the first mounting plate 100, and on the front side are also provided circular holes configured to expose universal wheels of the first universal wheel assembly 500 from the bottom surface of the first mounting plate 100. The first mounting plate 100 is also provided with a square hole in the middle.

On the rear side of the second mounting plate 200 is provided a circular hole configured to expose universal wheels of the second universal wheel assembly 400 from a bottom surface of the second mounting plate 200.

By providing the above-mentioned holes recessed inward and circular holes, main parts of the drive wheel assemblies 300, the first universal wheel assembly 500 and the second universal wheel assembly 400 can all be mounted above the first mounting plate 100 and the second mounting plate 200, with the drive wheels and the universal wheels being exposed from the bottom surfaces. Such configuration can effectively protect the main parts and facilitate assembly.

FIGS. 5-8 show structural diagrams of the drive wheel assemblies 300. The structures of the two drive wheel assemblies 300 may be the same or different.

In some embodiments, each of the two drive wheel assemblies 300 includes a drive wheel bracket 301, a speed reducer 302, a motor 304 and a drive wheel 305, the drive wheel bracket 301 being fixedly mounted on the first mounting plate 100 by screws, the speed reducer 302 being mounted on the drive wheel bracket 301, the motor 304 being connected to the speed reducer 302, and the drive wheel 305 being in drive connection with an output shaft of the speed reducer 302.

The speed reducer 302 may be a hypoid flange output reducer, and the speed reducer 302 is fixedly mounted on the drive wheel bracket 301 by a first screw 303. The motor 304 is fixedly connected to the speed reducer 302 by a second bolt 309. The drive wheel 305 may be a polyurethane covered wheel, and the drive wheel 305 is fixedly connected to an output flange end of the speed reducer 302 by a first bolt 308. A dust cover 306 functions to seal the whole wheel train, and the dust cover 306 is connected to the drive wheel bracket 301 by a second screw 307.

Power is transferred in such a manner that the motor 304 drives the speed reducer 302 to rotate, which in turn causes the drive wheel 305 to rotate.

Figure 9:
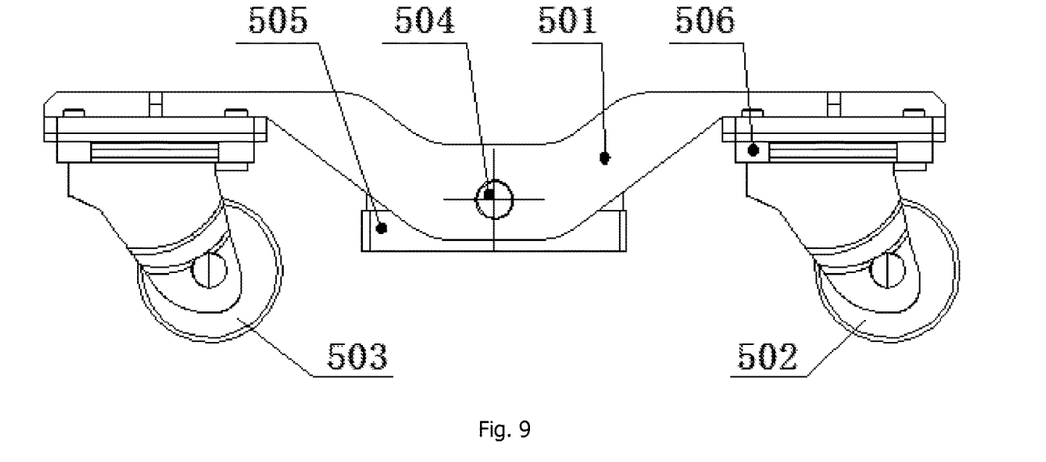
FIG. 9 is a front view of a first universal wheel assembly in some embodiments of the chassis of an automated guided vehicle of the present disclosure.
Figure 10:
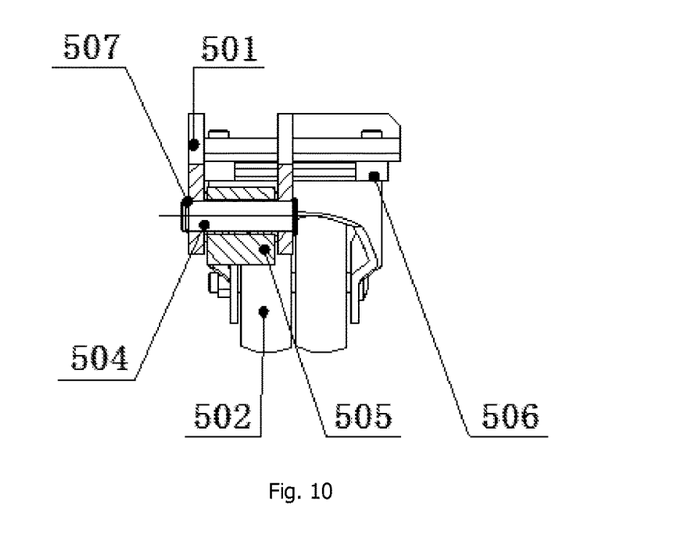
FIG. 10 is a right view of the drive wheel assembly in some embodiments of the chassis of an automated guided vehicle of the present disclosure.

FIGS. 9 and 10 show structural diagrams of the first universal wheel assembly 500. The second universal wheel assembly 400 may be of the same structure as the first universal wheel assembly 500, or of a different structure from the first universal wheel assembly 500.

In some embodiments, the first universal wheel assembly 500 includes a first mounting bracket 501, a first universal wheel 502, and a second universal wheel 503, the first mounting bracket 501 being rotatably mounted on the first mounting plate 100, the first universal wheel 502 being mounted at a first end of the first mounting bracket 501, and the second universal wheel 503 being mounted at a second end of the first mounting bracket 501.

The second universal wheel assembly 400 includes a second mounting bracket, a third universal wheel, and a fourth universal wheel, the second mounting bracket being rotatably mounted on the second mounting plate 200, the third universal wheel being mounted at a first end of the second mounting bracket, and the fourth universal wheel being mounted at a second end of the second mounting bracket.

The first universal wheel assembly 500 and the second universal wheel assembly 400 are both configured with double wheels, which can increase the contact area with the ground and reduce the intensity of pressure on the ground.

The first universal wheel 502 and the second universal wheel 503 are connected to the first mounting bracket 501 by third bolts 506, respectively, and the first mounting bracket 501 is rotatably connected to a third connecting seat 505 by a first articulated shaft 504, and the first mounting bracket 501 can rotate about the first articulated shaft 504 so that at least one of the first universal wheel 502 and the second universal wheel 503 can contact the ground when the road surface is uneven. A first shaft clip 507 is configured to prevent the first articulated shaft 504 from falling off. The first articulated shaft 504 is a stepped shaft. A bottom surface of the third connecting seat 505 is fixedly connected to the first mounting plate 100 by a bolt.

In some embodiments, a connecting line between a rotation center of the first universal wheel 502 and a rotation center of the second universal wheel 503 is parallel to a rotation axis between the first mounting plate 100 and the second mounting plate 200; and/or a connecting line between a rotation center of the third universal wheel and a rotation center of the fourth universal wheel is parallel to the rotation axis between the first mounting plate 100 and the second mounting plate 200.

In some embodiments, the first mounting plate 100 is provided on the front side of the automated guided vehicle, and the second mounting plate 200 is provided on the rear side of the automated guided vehicle, and the rotation axis between the first mounting plate 100 and the second mounting plate 200 is transverse, and perpendicular to a traveling direction of the automated guided vehicle. The first universal wheel 502 and the second universal wheel 503 are arranged in the left-right direction, and the first mounting bracket 501 is parallel to the rotation axis, and a connecting line between a rotation center of the first universal wheel 502 and a rotation center of the second universal wheel 503 is also parallel to the rotation axis, both being perpendicular to the traveling direction of the automated guided vehicle. The advantage of this configuration is that the first mounting plate 100 and the second mounting plate 200 enables the vehicle body to resist the unevenness of the road surface in the front-rear direction, and the first universal wheel 502 and the second universal wheel 503 enables the vehicle body to resist the unevenness of the road surface in left-right direction, to ensure the stability of the vehicle body overall.

In other embodiments, it may also be configured such that the first universal wheel 502 and the second universal wheel 503 are arranged in the front-rear direction, and the first mounting plate 100 and the second mounting plate 200 are arranged in the left-right direction.

In other embodiments, the first universal wheel assembly and the second universal wheel assembly may each include one universal wheel.

Figure 11:
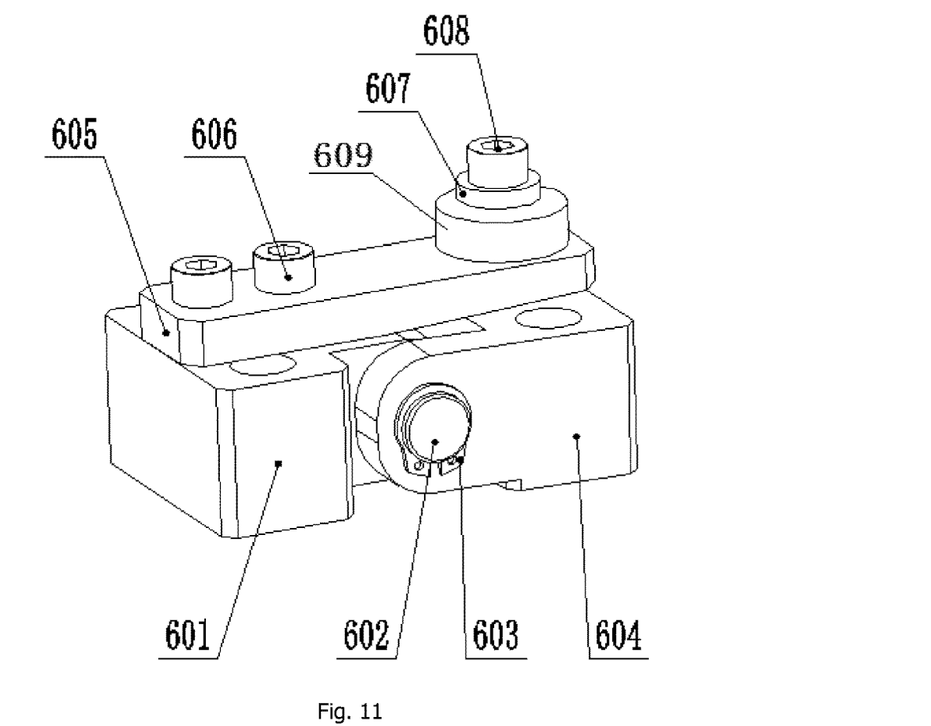
FIG. 11 is a structural diagram of a connection assembly in some embodiments of the chassis of an automated guided vehicle of the present disclosure.
Figure 12:
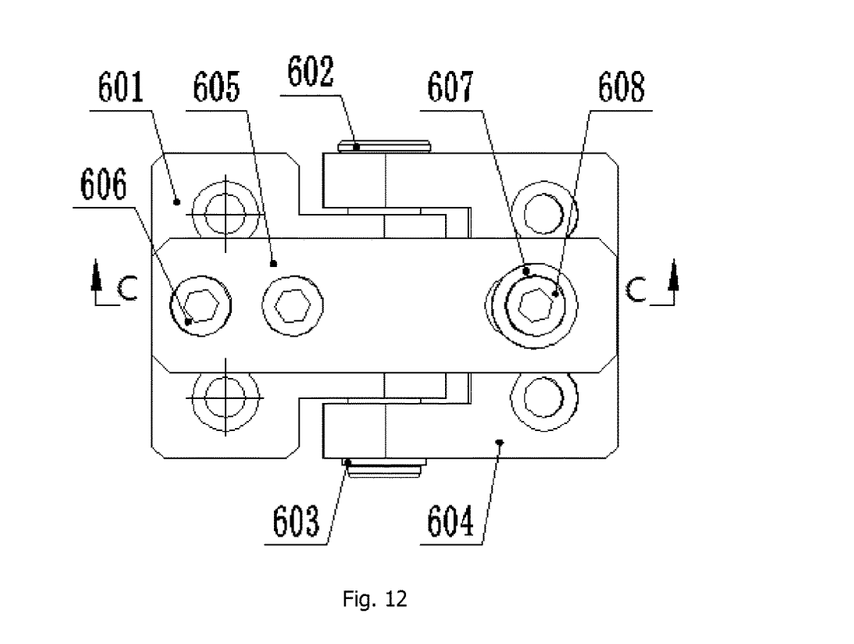
FIG. 12 is a top view of the connection assembly in some embodiments of the chassis of an automated guided vehicle of the present disclosure.
Figure 13:
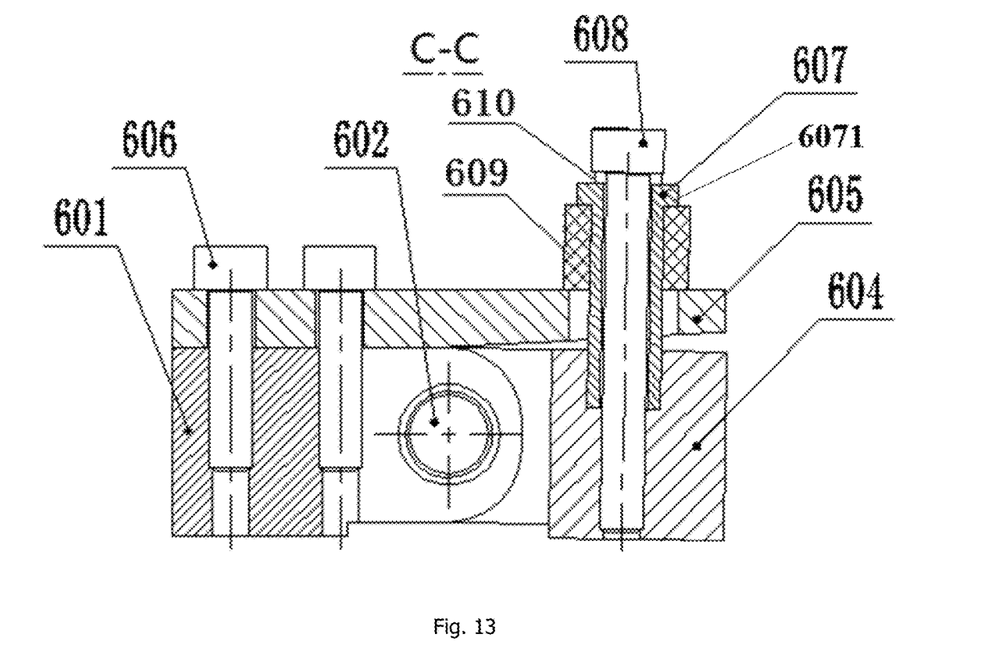
FIG. 13 is a schematic diagram of a C-C cross section in FIG. 12.

FIGS. 11-13 show structural diagrams of the connection assemblies 600.

In some embodiments, the connection assemblies 600 are connected between the first mounting plate 100 and the second mounting plate 200 to enable the first mounting plate 100 and the second mounting plate 200 to rotate relative to each other.

Each connection assembly 600 includes a first connecting seat 601, a second connecting seat 604 and a first connecting shaft, the first connecting seat 601 being mounted on the first mounting plate 100, the second connecting seat 604 being mounted on the second mounting plate 200, and the first connecting shaft being configured to connect the first connecting seat 601 and the second connecting seat 604 to enable the first connecting seat 601 and the second connecting seat 604 to rotate relative to each other.

The connection assembly 600 further includes a limiting assembly configured to limit an angle of the relative rotation between the first mounting plate 100 and the second mounting plate 200. By providing the limiting assembly, a maximum angle of the relative rotation between the first mounting plate 100 and the second mounting plate 200 can be limited to prevent the vehicle body from shaking too much.

The limiting assembly includes a limiting plate 605, the limiting plate 605 being connected to the first connecting seat 601 and a surface of the limiting plate 605 close to the first connecting seat 601 including a first mating part and a second mating part abutted with the first mating part, the first mating part being in contact with an upper surface of the first connecting seat 601, the second mating part extending in a direction away from the first connecting seat 601 and being inclined upward with respect to the first mating part. An included angle between the first mating part and the second mating part is less than 180°. Upper surfaces of the first connecting seat 601 and the second connecting seat 604 are parallel to each other.

The advantage of such configuration is that a certain distance may be formed between the second mating part and the plane where the upper surface of the first connecting seat 601 is located, and the distance gradually increases along a direction of approaching the second connecting seat 604, so that the second mounting plate 200 connected to the second connecting seat 604 can rotate counterclockwise upward relative to the first mounting plate 100 and stop when the upper surface of the second connecting seat 604 is in contact with the second mating part.

In some embodiments, the limiting assembly further includes a limiting sleeve 607, the limiting sleeve 607 being mounted on the second connecting seat 604, the limiting plate 605 being provided with a first hole, a diameter of the first hole being greater than an outer diameter of the limiting sleeve 607, the limiting sleeve 607 passing through the first hole and moving relative to the limiting plate 605, the limiting sleeve 607 being provided with a limiting part 6071 at an end away from the second connecting seat 604, the limiting part 6071 being configured to restrict the limiting sleeve 607 from escaping from the first hole. There is a movement space between the limiting part 6071 and the upper surface of the limiting plate 605 so that the limiting sleeve 607 and the second connecting seat 604 can rotate clockwise downward and stop when the limiting part 6071 is in contact with the upper surface of the limiting plate 605.

In some embodiments, the limiting part 6071 includes a boss extending radially outwardly of the limiting sleeve 607, and the diameter of the limiting part 6071 is greater than that of the first hole.

In some embodiments, the connection assembly 600 further includes a spacer sleeve 609, the spacer sleeve 609 being arranged between the limiting plate 605 and the limiting part 6071. The spacer sleeve 609 may be a rubber sleeve, such that the limiting part 6071 can squeeze the rubber sleeve and move downward; or a gap of a certain height may also be preset between the spacer sleeve 609 and the limiting part 6071.

To facilitate the installation of the limiting sleeve 607, the second connecting seat 604 is provided with a recess, into which the bottom of the limiting sleeve 607 is inserted, and the limiting sleeve 607 is provided with a through hole in the center, and a fifth bolt 608 passes through the limiting sleeve 607 and is connected to the second connecting seat 604 by means of threads to fix the limiting sleeve 607 to the second connecting seat 604.

In some embodiments, the first connecting seat 601 and the second connecting seat 604 are connected in an articulated manner by a second articulated shaft 602, and a second shaft clip 603 is configured to prevent the second articulated shaft 602 from falling off. The first connecting seat 601 is fixed on the first mounting plate 100 through the first mounting holes 101 and bolts. The second connecting seat 604 is fixed on the second mounting plate 200 through the fifth mounting holes 201 and bolts. The number of the connection assembly 600 is two to achieve articulated connection of the first mounting plate 100 and the second mounting plate 200.

The limiting plate 605 is fixed to the upper end face of the first connecting seat 601 by two fourth bolts 606. The second connecting seat 604 stops after rotating about the second articulated shaft 602 to a lower bottom surface of the limiting plate 605.

In some embodiments, the limiting sleeve 607 is a hollow stepped shaft that runs through the first hole in the limiting plate 605 and is inserted into the recess in the second connecting seat 604, and is fixedly connected to the second connecting seat 604 by the fifth bolt 608, and a gasket 610 is provided between the fifth bolt 608 and the limiting sleeve 607. This allows the second connecting seat 604 to stop after rotating about the second articulated shaft 602 to a position where a lower end face of a step of the limiting sleeve 607 abuts against the upper end face of the limiting plate 605.

Figure 15:
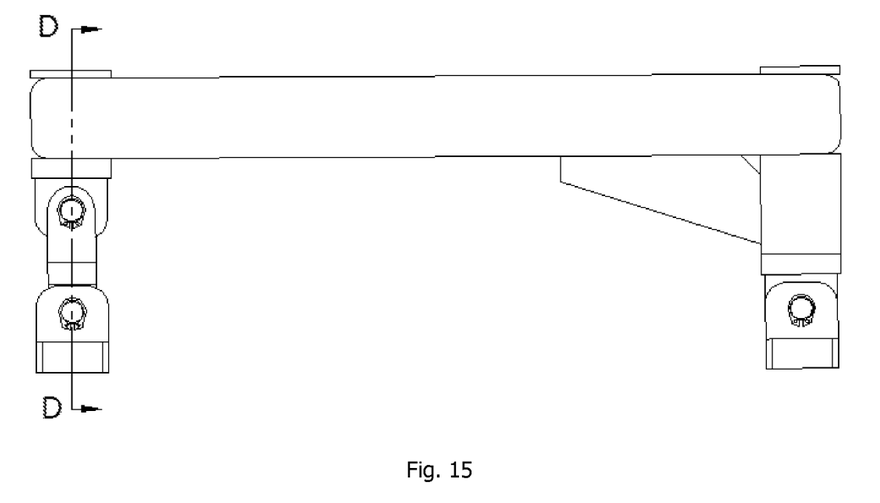
FIG. 15 is a front view of FIG. 14.
Figure 16:
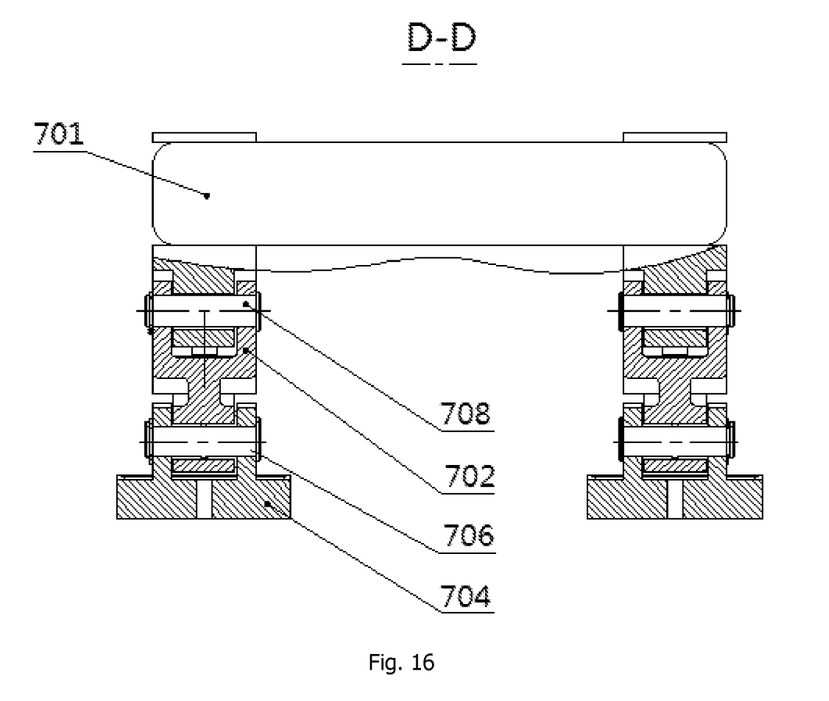
FIG. 16 is a schematic diagram of a D-D cross section in FIG. 15.

FIGS. 14-16 show structural diagrams of the support body 700.

In some embodiments, the support body 700 includes a support frame 701, two first connecting rods 702 and two second connecting rods 703, the support body 700 being in a cuboid shape, the support frame 701 being a rectangular planar frame, and the top of the support frame 701 being connected to the vehicle body or other components to carry the load.

In the case the ground is horizontal, the first connecting rods 702 are perpendicular to the plane where the support frame 701 is located and perpendicular to the first mounting plate 100, the plane where the support frame 701 is located being parallel to the first mounting plate 100 and the second mounting plate 200, and the second connecting rods 703 are perpendicular to the second mounting plate 200 and also perpendicular to the plane where the support frame 701 is located.

A rib plate 712 is provided between the second connecting rods 703 and the support frame 701.

In some embodiments, the support body 700 further includes two first mounting seats 704 and two second mounting seats 705, the two first mounting seats 704 being mounted on the first mounting plate 100 through the third mounting holes 103, respectively, and the two second mounting seats 705 being mounted on the second mounting plate 200 through the seventh mounting hole 203, respectively. The two first mounts 704 are rotatably connected to the first connecting rods 702 by third articulated shafts 706, and third shaft clips 707 prevent the third articulated shafts 706 from falling off. The two second mounting seats 705 are rotatably connected to fourth mounting seats 711 provided at ends of the second connecting rods 703 by fifth articulated shafts 709. The first connecting rods 702 are also rotatably connected to third mounting seats 710 provided on the support frame 701 by fourth articulated shafts 708.

The top of the support frame 701 is provided with backing plates 713 for connection with the vehicle body or other components to bear the load.

In some embodiments, a connection body of the first mounting plate 100, the second mounting plate 200, the first connecting rods 702 and the support frame 701 and the second connecting rods 703 is connected in an articulated manner to form a four-link mechanism, such that when the ground is uneven, both the first wheel set and the second wheel set can be kept in contact with the ground through deformation of the four-link mechanism, thus ensuring the stability of the vehicle body.

From the description of multiple embodiments of the chassis of an automated guided vehicle and the automated guided vehicle of the present disclosure, it can be seen the embodiments of the chassis of an automated guided vehicle and the automated guided vehicle of the present disclosure have at least one or more of the following advantages:

1. As the first mounting plate and the second mounting plate are rotatably connected, the positive pressure on the ground by the vehicle can increase with the increase of a cargo load, which allows the self-weight of a trolley to be reduced, and can achieve mechanical damping, and the chassis of the trolley can be adjusted by itself with the ground unevenness, without additional damping and positive pressure measures, thus saving costs.
2. As the first wheel set includes the first universal wheel assembly and two drive wheel assemblies to form a triangular support structure, the drive wheels and universal wheels can all be brought into contact with the ground and each bear a certain load.
3. As the connection assembly includes the limiting assembly, the rotation angle between the first mounting plate and the second mounting plate is effectively limited and the position of the chassis is limited.
4. As the first universal wheel assembly and the second universal wheel assembly respectively is provided with double wheels and articulated, the contact area with the ground is effectively increased and the intensity of pressure on the ground is reduced, and as the first mounting bracket and the first mounting plate are rotatably connected and the second mounting bracket and the second mounting plate are rotatably connected, it can also ensure that at least one universal wheel touches the ground.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof without departing from the principle of the present disclosure; and such modifications and equivalent substitutions should be encompassed within the technical solutions sought for protection in the present disclosure.

The invention claimed is:

1. A chassis of an automated guided vehicle, comprising:
a first mounting plate;
a first wheel set mounted on the first mounting plate;
a second mounting plate rotatably connected to the first mounting plate;
a second wheel set mounted on the second mounting plate;
a support frame;
a first connecting rod rotatably connected to the support frame and the first mounting plate, respectively; and
a second connecting rod whose first end is fixedly connected to the support frame and whose second end is rotatably connected to the second mounting plate;
the chassis further comprising a connection assembly and a limiting assembly configured to limit an angle of rotation between the first mounting plate and the second mounting plate, the connection assembly being connected between the first mounting plate and the second mounting plate to enable the first mounting plate and the second mounting plate to rotate relative to each other, and the connection assembly comprises:
a first connecting seat mounted on the first mounting plate;
a second connecting seat mounted on the second mounting plate; and
a first connecting shaft configured to connect the first connecting seat and the second connecting seat to enable the first connecting seat and the second connecting seat to rotate relative to each other;
the limiting assembly comprising a limiting plate, the limiting plate being connected to the first connecting seat and a surface of the limiting plate close to the first connecting seat comprising a first mating part and a second mating part connected with the first mating part, the first mating part being in contact with an upper surface of the first connecting seat, the second mating part extending in a direction away from the first connecting seat and being inclined upward with respect to the first mating part.

2. The chassis of an automated guided vehicle according to claim 1, comprising two said first connecting rods and two said second connecting rods, the support frame being rectangular, the two first connecting rods, the two second connecting rods and the support frame being connected to form a cuboid support bracket.

3. The chassis of an automated guided vehicle according to claim 1, wherein the limiting assembly further comprises a limiting sleeve, the limiting sleeve being mounted on the second connecting seat, the limiting plate being provided with a first hole, a diameter of the first hole being greater than an outer diameter of the limiting sleeve, the limiting sleeve passing through the first hole and movable relative to limiting plate, the limiting sleeve being provided with a limiting part at an end away from the second connecting seat, the limiting part being configured to restrict the limiting sleeve from escaping from the first hole.

4. The chassis of an automated guided vehicle according to claim 3, wherein the limiting part comprises a boss extending radially outwardly of the limiting sleeve, and the diameter of the limiting part is greater than the diameter of the first hole.

5. The chassis of an automated guided vehicle according to claim 3, wherein the limiting assembly further comprises a spacer sleeve, the spacer sleeve being arranged between the limiting plate and the limiting part.

6. The chassis of an automated guided vehicle according to claim 1, wherein the first wheel set comprises a first universal wheel assembly and a drive wheel assembly, and the second wheel set comprises a second universal wheel assembly.

7. The chassis of an automated guided vehicle according to claim 6, wherein
the first universal wheel assembly comprises:
   a first mounting bracket rotatably mounted on the first mounting plate;
   a first universal wheel mounted at a first end of the first mounting bracket; and
   a second universal wheel mounted at a second end of the first mounting bracket; and/or
the second universal wheel assembly comprises:
   a second mounting bracket rotatably mounted on the second mounting plate;
   a third universal wheel mounted at a first end of the second mounting bracket; and
   a fourth universal wheel mounted at a second end of the second mounting bracket.

8. The chassis of an automated guided vehicle according to claim 7, wherein a connecting line between a rotation center of the first universal wheel and a rotation center of the second universal wheel is parallel to a rotation axis between the first mounting plate and the second mounting plate; and/or a connecting line between a rotation center of the third universal wheel and a rotation center of the fourth universal wheel is parallel to a rotation axis between the first mounting plate and the second mounting plate.

9. The chassis of an automated guided vehicle according to claim 6, comprising two said drive wheel assemblies, the two drive wheel assemblies being mounted on two sides of the first mounting plate, respectively, each of the two drive wheel assemblies comprising:
   a drive wheel bracket mounted on the first mounting plate;
   a speed reducer mounted on the drive wheel bracket;
   a motor connected to the speed reducer; and
   a drive wheel in drive connection with an output shaft of the speed reducer.

10. An automated guided vehicle, comprising the chassis of an automated guided vehicle of claim 1.

* * * * *